(12) United States Patent
Yuan et al.

(10) Patent No.: US 11,429,472 B1
(45) Date of Patent: Aug. 30, 2022

(54) AUTOMATED COGNITIVE SOFTWARE APPLICATION ERROR DETECTION

(71) Applicant: INTERNATIONAL BUSINESS MACHINES CORPORATION, Armonk, NY (US)

(72) Inventors: Zhong Fang Yuan, Xian (CN); Tong Liu, Xian (CN); Li Ni Zhang, Beijing (CN); Yong Fang Liang, Beijing (CN); Chen Gao, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/301,138

(22) Filed: Mar. 26, 2021

(51) Int. Cl.
| | |
|---|---|
| *G06F 11/00* | (2006.01) |
| *G06F 11/07* | (2006.01) |
| *G06F 16/245* | (2019.01) |
| *G06N 20/00* | (2019.01) |
| *G06F 11/36* | (2006.01) |

(52) U.S. Cl.
CPC ........ *G06F 11/079* (2013.01); *G06F 11/0751* (2013.01); *G06F 11/0775* (2013.01); *G06F 11/0793* (2013.01); *G06F 16/245* (2019.01); *G06F 11/3672* (2013.01); *G06N 20/00* (2019.01)

(58) Field of Classification Search
CPC ............. G06F 11/0751; G06F 11/0775; G06F 11/0793
USPC ....................................................... 714/1–57
See application file for complete search history.

(56) References Cited

U.S. PATENT DOCUMENTS

| | | | |
|---|---|---|---|
| 7,647,524 B2 * | 1/2010 | Ide ....................... | G06F 11/0709 709/224 |
| 2004/0042469 A1 * | 3/2004 | Clark ...................... | H04L 45/36 370/401 |
| 2005/0283675 A1 * | 12/2005 | Krebs ..................... | G06F 9/453 714/38.1 |
| 2012/0290879 A1 * | 11/2012 | Shibuya ............... | G05B 23/021 714/26 |

(Continued)

FOREIGN PATENT DOCUMENTS

| | | |
|---|---|---|
| CN | 103150454 A | 6/2013 |
| CN | 107153822 A | 9/2017 |

(Continued)

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Sarai E Butler
(74) *Attorney, Agent, or Firm* — Schmeiser, Olsen & Watts; Christopher M. Pignato

(57) ABSTRACT

A method, system, and computer program product for implementing automated cognitive software application error detection is provided. The method includes receiving data associated with model based self-learning software code. The annotated data is automatically divided with respect to specified categorization and grouping attributes and categorized groups comprising portions of the annotated data are generated and analyzed. At least one incorrect annotation associated a group of the categorized groups is detected and filtered. Likewise, a correct annotation for the group is detected and retrieved from a database. The correct annotation is appended to the group.

16 Claims, 10 Drawing Sheets

(56) References Cited

U.S. PATENT DOCUMENTS

| | | | |
|---|---|---|---|
| 2013/0346409 A1* | 12/2013 | Welinder | G06N 20/00 |
| | | | 707/737 |
| 2014/0143347 A1* | 5/2014 | Murarka | H04L 51/52 |
| | | | 709/206 |
| 2016/0132372 A1* | 5/2016 | Anderson | G06F 11/0751 |
| | | | 714/15 |
| 2017/0091164 A1 | 3/2017 | Bao | |
| 2019/0155591 A1* | 5/2019 | Kumar | G06F 11/34 |
| 2019/0340059 A1* | 11/2019 | Bagarolo | G06F 8/71 |
| 2020/0050891 A1* | 2/2020 | Krueger | G06K 9/6256 |
| 2020/0065706 A1 | 2/2020 | Kao | |
| 2020/0147804 A1* | 5/2020 | Sugiyama | G06T 7/73 |
| 2020/0327338 A1* | 10/2020 | Philion | G05D 1/0088 |

FOREIGN PATENT DOCUMENTS

| | | |
|---|---|---|
| CN | 111259980 A | 6/2020 |
| WO | 2020054028 A1 | 3/2020 |

\* cited by examiner

AUTOMATED COGNITIVE SOFTWARE APPLICATION ERROR DETECTION

BACKGROUND

The present invention relates generally to a method for automatically detecting software application errors and in particular to a method and associated system for improving software technology associated with categorizing groups of annotated data, detecting incorrect and correct groups of the annotated data, and enabling a filtering process for appending the groups of data to software code for software error detection.

SUMMARY

A first aspect of the invention provides an automated cognitive software application error detection method comprising: receiving, by a processor of a server hardware device, annotated data associated with model based self-learning software code; automatically dividing, by the processor, the annotated data with respect to specified categorization and grouping attributes; generating, by the processor in response to results of the automatically dividing, categorized groups comprising portions of the annotated data; analyzing, by the processor, the categorized groups; detecting, by the processor based on results of the analyzing, at least one incorrect annotation associated with at least one group of the categorized groups; filtering, by the processor, the at least one incorrect annotation from the at least one group of the categorized groups; detecting, by the processor within a database, a correct annotation for the at least one group of the categorized groups; retrieving, by the processor from the database, the correct annotation; and appending, by the processor, the correct annotation to the at least one group of the categorized groups.

A second aspect of the invention provides a computer program product, comprising a computer readable hardware storage device storing a computer readable program code, the computer readable program code comprising an algorithm that when executed by a processor of a server hardware device implements an automated cognitive software application error detection method, the method comprising: receiving, by the processor, annotated data associated with model based self-learning software code; automatically dividing, by the processor, the annotated data with respect to specified categorization and grouping attributes; generating, by the processor in response to results of the automatically dividing, categorized groups comprising portions of the annotated data; analyzing, by the processor, the categorized groups; detecting, by the processor based on results of the analyzing, at least one incorrect annotation associated with at least one group of the categorized groups; filtering, by the processor, the at least one incorrect annotation from the at least one group of the categorized groups; detecting, by the processor within a database, a correct annotation for the at least one group of the categorized groups; retrieving, by the processor from the database, the correct annotation; and appending, by the processor, the correct annotation to the at least one group of the categorized groups.

A third aspect of the invention provides a server hardware device comprising a processor coupled to a computer-readable memory unit, the memory unit comprising instructions that when executed by the processor implements an automated cognitive software application error detection method comprising: receiving, by the processor, annotated data associated with model based self-learning software code; automatically dividing, by the processor, the annotated data with respect to specified categorization and grouping attributes; generating, by the processor in response to results of the automatically dividing, categorized groups comprising portions of the annotated data; analyzing, by the processor, the categorized groups; detecting, by the processor based on results of the analyzing, at least one incorrect annotation associated with at least one group of the categorized groups; filtering, by the processor, the at least one incorrect annotation from the at least one group of the categorized groups; detecting, by the processor within a database, a correct annotation for the at least one group of the categorized groups; retrieving, by the processor from the database, the correct annotation; and appending, by the processor, the correct annotation to the at least one group of the categorized groups.

The present invention advantageously provides a simple method and associated system capable of automatically detecting software application errors.

DETAILED DESCRIPTION

Figure 1:
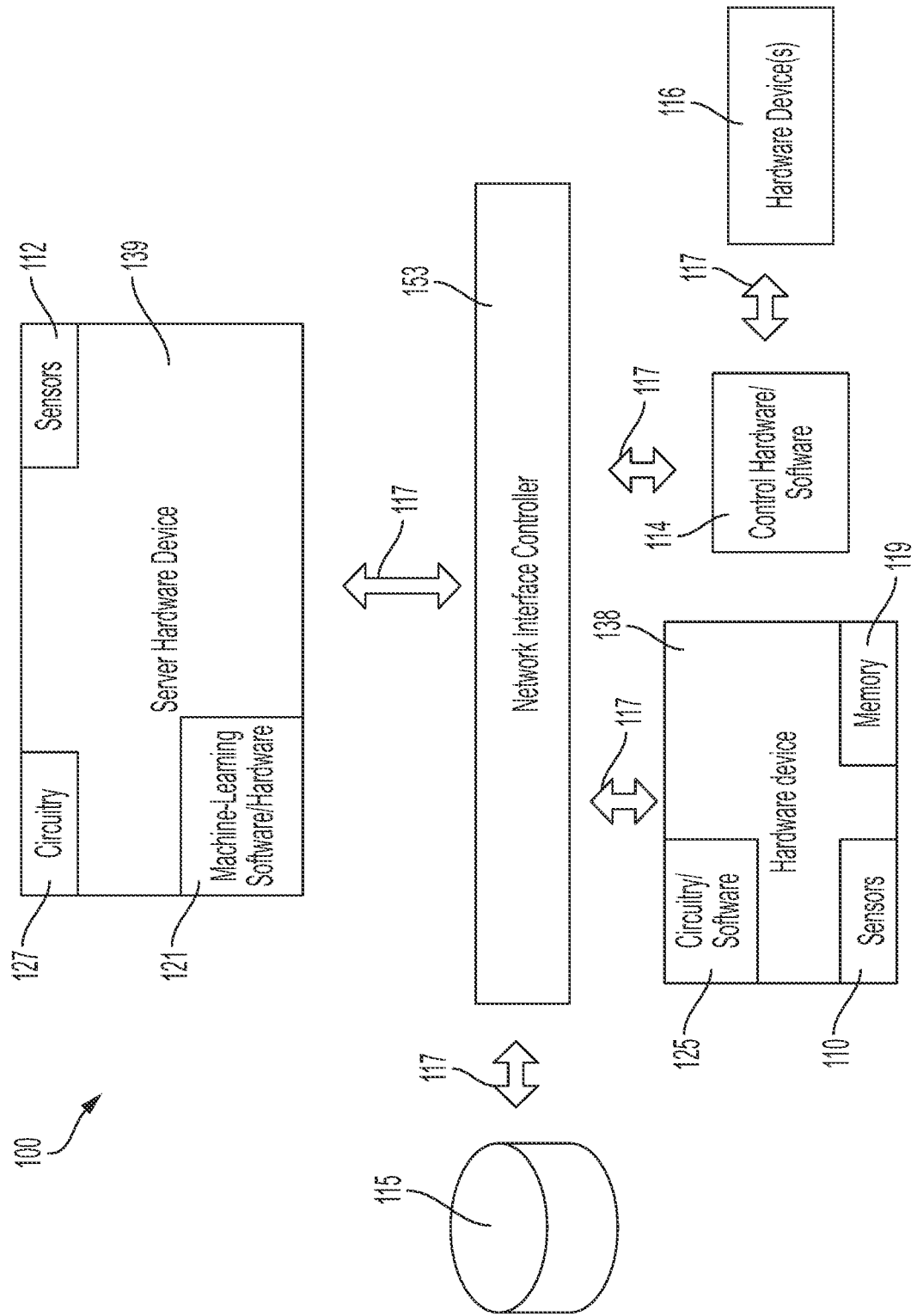
FIG. 1 illustrates a system for improving software technology associated with categorizing groups of annotated data, detecting incorrect and correct groups of the annotated data, and enabling a filtering process for appending the groups of data to software code for software error detection, in accordance with embodiments of the present invention.

FIG. 1 illustrates a system 100 for improving software technology associated with categorizing groups of annotated data, detecting incorrect and correct groups of the annotated data, and enabling a filtering process for appending the groups of data to software code for software error detection, in accordance with embodiments of the present invention. In typical industrial scenarios, the execution of deep learning algorithms often require a large amount of labeled data and associated code manually labeled by labeling personnel typically resulting in a large amount of incorrectly labeled data and code. Although erroneous data does not account for a large proportion of a total data set, the incorrect labeling of data may be associated with consequences with respect to the training and use of an entire deep learning algorithm. For example, an algorithm may fail to converge or be associated with a prediction or controls failure. Likewise, after the completion of data/code labeling, it may be very difficult to locate incorrect data within completed data/code. A first typical solution may include replacing a batch of data labelers and manually re-screening the data/code. The aforementioned solution may consume a large number of human resources. A second typical solution may include clustering processes and additional unsupervised methods for data/code diagnosis, but this solution may require excessive calculation and result in inaccurate results. System 100 provides improvements to the deficiencies of the aforementioned scenarios by: effectively dividing the data/code and automatically generating filter thresholds corresponding to different categories. The filtering thresholds are configured to automatically filter portions of data/code that may be marked as incorrect thereby assisting labeling personnel for performing a data/code self-check process. Likewise, system 100 enables an automated process that does not require manual intervention thereby allowing for an improved accuracy with respect to data and code execution.

System 100 enables a code labeling introspection process by executing a K-folder cross-division process with respect to original labeling data; and dividing the original labeling data into n categories each of which is divided into n parts for usage as training set copies for verification sets. A model may be executed for training a training set for generating predictions with respect to each sample within a code test set and recording confidence attributes of associated samples. The associated samples that predicted to be wrong are filtered out according to a level of confidence attributes.

System 100 of FIG. 1 includes a server hardware device 139 (i.e., specialized hardware), a computing (hardware) hardware device 138, control hardware/software 114, a hardware device 116 (e.g., capable of being operationally controlled such as a robotic device), a database 115, and a network interface controller 153 interconnected through a network 117. Server hardware device 139 includes specialized circuitry 127 (that may include specialized software), sensors 112, and machine learning software code/hardware structure 121 (i.e., including machine learning software code). Network interface controller 153 may include any type of device or apparatus for securely interfacing hardware and software to a network. Hardware device 138 comprises any type of hardware or software device associated with communications with server hardware device 139 and control hardware/software 114. Hardware device 138 includes specialized circuitry 125 (that may include specialized software), memory 119, and sensors 110. Sensors 110 and 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Control hardware is configured to command and control operation with respect to hardware device(s) 116. Hardware device(s) may comprise any type of hardware device capable of accepting commands and control signals for controlling operational functions. For example, hardware device(s) may comprise a robotic mechanism, data acquisition hardware (e.g., pressure sensors, motors, electro-mechanical valve, solenoids), etc. Server hardware device 139, hardware device 138, control hardware/software 114, and hardware device(s) 116 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 139, hardware device 138, control hardware/software 114, and hardware device(s) 116 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-10. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with categorizing groups of annotated data, detecting incorrect and correct groups of the annotated data, and enabling a filtering process for appending the groups of data to software code for software error detection. Network 117 may include any type of network including, inter alia, a 5G telecom network, a local area network, (LAN), a wide area network (WAN), the Internet, a wireless network, etc. Alternatively, network 117 may include an application programming interface (API).

System 100 is enabled for utilizing cognitive software/hardware technology for providing introspect annotation of data and code for detecting incorrect annotated data before predicting results within a software model. The cognitive software/hardware technology implemented by system 100 enables the following features:

1. Automatically dividing and grouping/categorizing annotated data and code.
2. Verifying annotated data and code for detecting incorrect annotation/labels in a software model.
3. Filtering out incorrect annotated data and code based on a confidence level of an error threshold.

Figure 2:
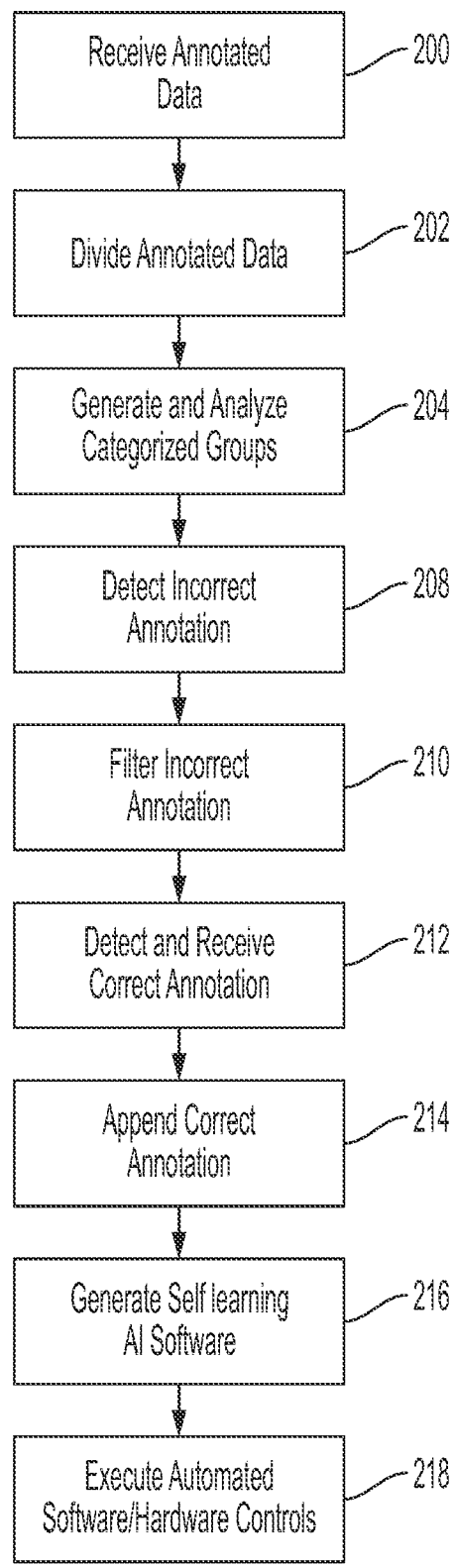
FIG. 2 illustrates an algorithm detailing a process flow enabled by the system of FIG. 1 for improving software technology associated with categorizing groups of annotated data, detecting incorrect and correct groups of the annotated data, and enabling a filtering process for appending the groups of data to software code for software error detection, in accordance with embodiments of the present invention.

FIG. 2 illustrates an algorithm detailing a process flow enabled by system 100 of FIG. 1 for improving software technology associated with categorizing groups of annotated data, detecting incorrect and correct groups of the annotated data, and enabling a filtering process for appending the groups of data to software code for software error detection, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 139, hardware device 138, control hardware/software 114, and hardware device(s) 116. In step 200, annotated data associated with model based self-learning software code is received via a server hardware device. The annotated data may be associated with artificial intelligence code of the model based self-learning software code. Alternatively, the annotated data may be associated with machine learning code of the model based self-learning software code.

In step 202, the annotated data is automatically divided with respect to specified (digital) categorization and grouping attributes. In step 204, categorized groups comprising portions of the annotated data are generated in response to results of step 202. The categorized groups are analyzed. Each categorized group may include training set portions. Automatically dividing the annotated data may include:
1. Adding Gaussian (digital) noises to a vector level for each data point of the annotated data within a same category.
2. Generating peripheral vectors derived from each data point.
3. Fitting newly generated support data to Gaussian mixture model software code.

In step 208, at least one incorrect annotation associated with at least one group of the categorized groups is detected based on results of step 204. In step 210, the at least one incorrect annotation is digitally filtered from the at least one group of categorized groups. The digital filtering process may be executed based on a detected confidence level of the at least one incorrect annotation exceeding an error level threshold. The digital filtering process may include:
1. Selecting a target intent with respect to associated intents with respect to a vector matching process.
2. Splicing a corpus within an intent associated with the target intent into an intent corpus.
3. Transmitting the corpus within the intent corpus to a training model for obtaining a probability value specifying that the intent corpus is associated with the target intent.
4. Generating the error level threshold based on a confidence level of the target intent.

In step 212, a correct annotation for the at least one group of categorized groups is detected within a database. The correct annotation is retrieved. In step 214, the correct annotation is appended to the at least one group of categorized groups. In step 216, self-learning (artificial intelligence based) software code for executing future processes associated with executing automated cognitive software application error detection processes is generated and stored within a modified portion of a memory structure of the server hardware device. In step 218, the self-learning software code is executed for enabling automated software and hardware control systems resulting in operation of hardware devices. For example, self-learning software code may be executed for enabling control of robotic arms on an assembly line.

Figure 3:
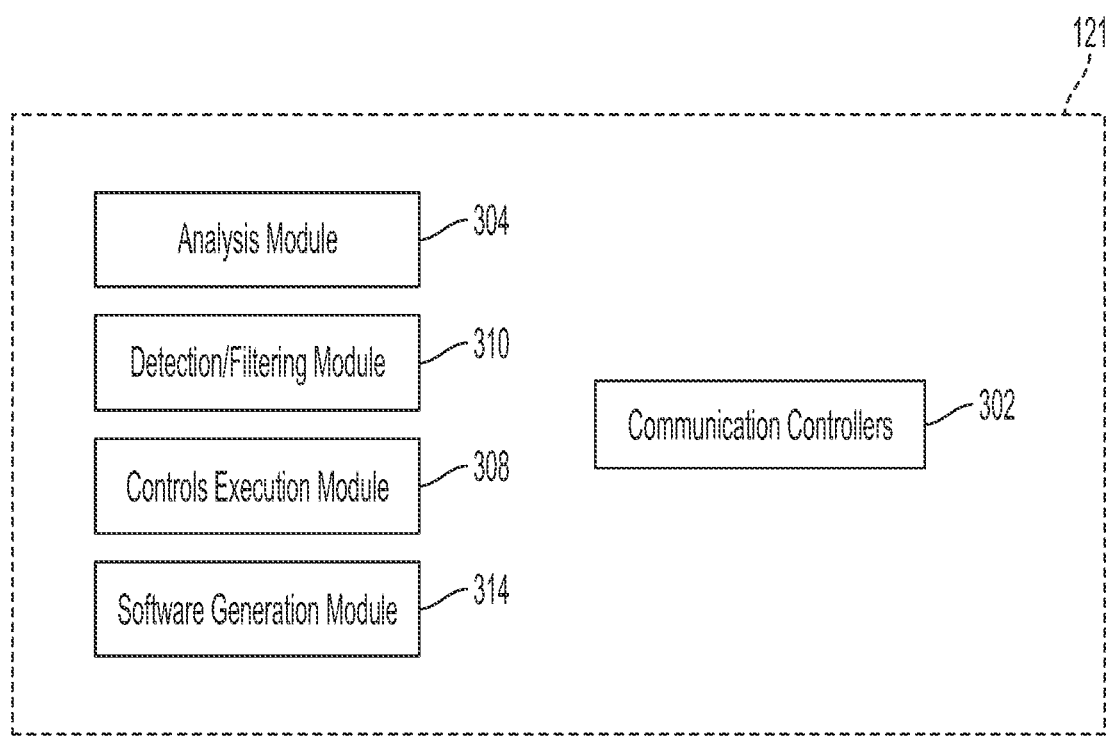
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry 127 and circuitry/software 125) of FIG. 1, in accordance with embodiments of the present invention. Machine learning software/hardware structure 121 includes an analysis module 304, a detection/filtering module 310, a controls execution module 308, a software generation module 314, and communication controllers 302. Analysis module 304 comprises specialized hardware and software for controlling all functions related to the analysis and dividing steps of FIGS. 1 and 2. Detection/filtering module 310 comprises specialized hardware and software for controlling all functionality related to the detection and filtering steps for filtering digital annotations from data and software. Controls execution module 308 comprises specialized hardware and software for controlling all functions related to the automated hardware software electro/mechanical device control steps of FIG. 2. Software generation module 314 comprises specialized hardware and software for controlling all functions related to generating software as described with respect to the algorithm of FIG. 2. Communication controllers 302 are enabled for controlling all communications between analysis module 304, detection/filtering module 310, controls execution module 308, and software generation module 314.

Figure 4:
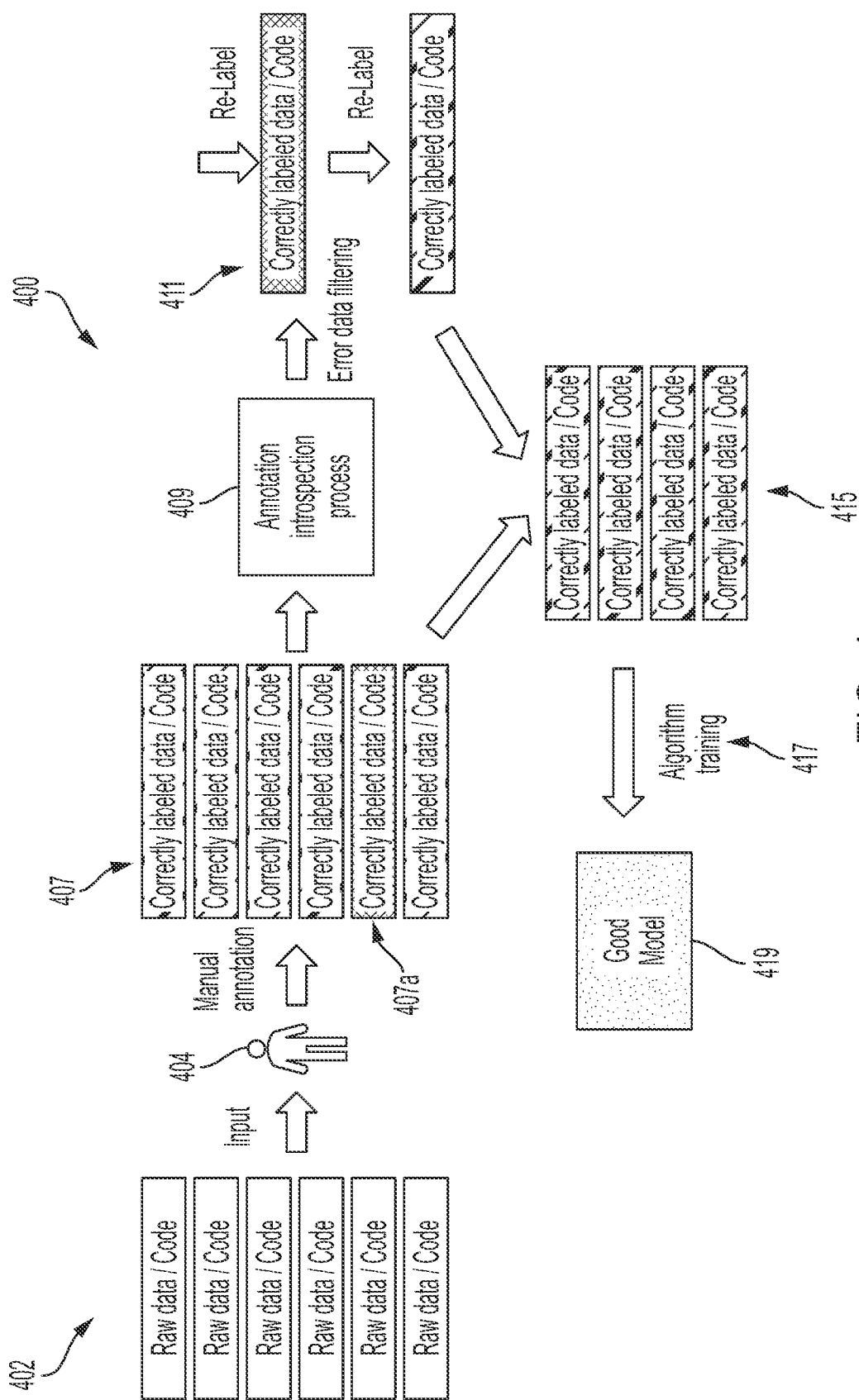
FIG. 4 illustrates a process for implementing labeling introspection code based on cognitive technology with respect to the algorithm of FIG. 2, in accordance with embodiments of the present invention.

FIG. 4 illustrates a process 400 for implementing labeling introspection code based on cognitive technology with respect to the algorithm of FIG. 2, in accordance with embodiments of the present invention. Process 400 is configured to automatically execute error data rejection code with respect to raw data/code 402 after labeling personnel 404 have marked the data/code 402 as possibly being associated with an error. Resulting data/code 407 is highlighted with respect to marking errors 407*a* and is inputted into an annotation introspection process for a second review by marking staff/code execution 411 resulting in correctly labeled data/code 415 for input into an algorithm training code 417 for digital model generation 419. This aforementioned process is executed based on data/code grouping and self-supervised models without a need to inject large amounts of human resources thereby resulting in a high accuracy process with respect to unsupervised algorithm represented by clustering methods.

Figure 5:
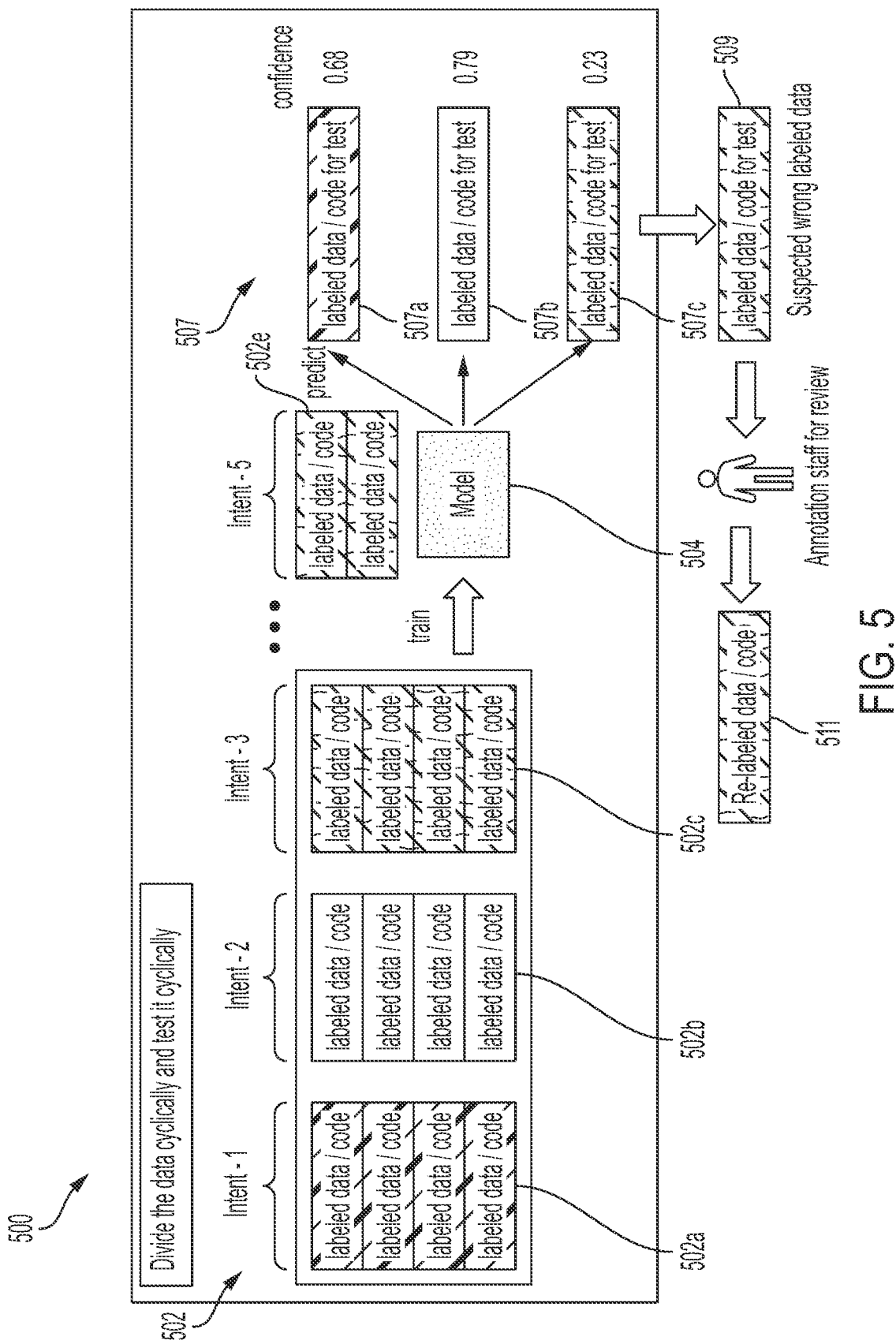
FIG. 5 illustrates a labeling introspection process, in accordance with embodiments of the present invention.

FIG. 5 illustrates a labeling introspection process 500, in accordance with embodiments of the present invention. Labeling introspection process 500 comprises a self-supervised process for recommending labeling data/code 502 for annotation by an annotator for secondary labeling through execution of a self-arrangement data process. The self-arrangement data process includes a first step for enabling a K-Folder cross-division of the original labeling data/code 502 (e.g., a 5-Folder approach). The original labeling data/code 502 is divided into 5 intent categories 502*a* ... 502*e*. Each of the 5 categories is divided into 5 portions of which 4 portions are used as training set copies for verification sets. Likewise, a model 504 is trained with respect to a training set 507 for generating predictions for each sample 507*a* ... 507*c* in the training set. An associated confidence level is recorded for each of sample 507*a* ... 507*c*. If a wrong sample 509 is divided into the training set, its confidence level will be lower than that of a correct sample 511. Subsequently samples that are likely to be wrong are filtered out in accordance with confidence level. The aforementioned process is repeated multiple times to ensure that each portion of data/code is divided into the training set.

Figure 6:
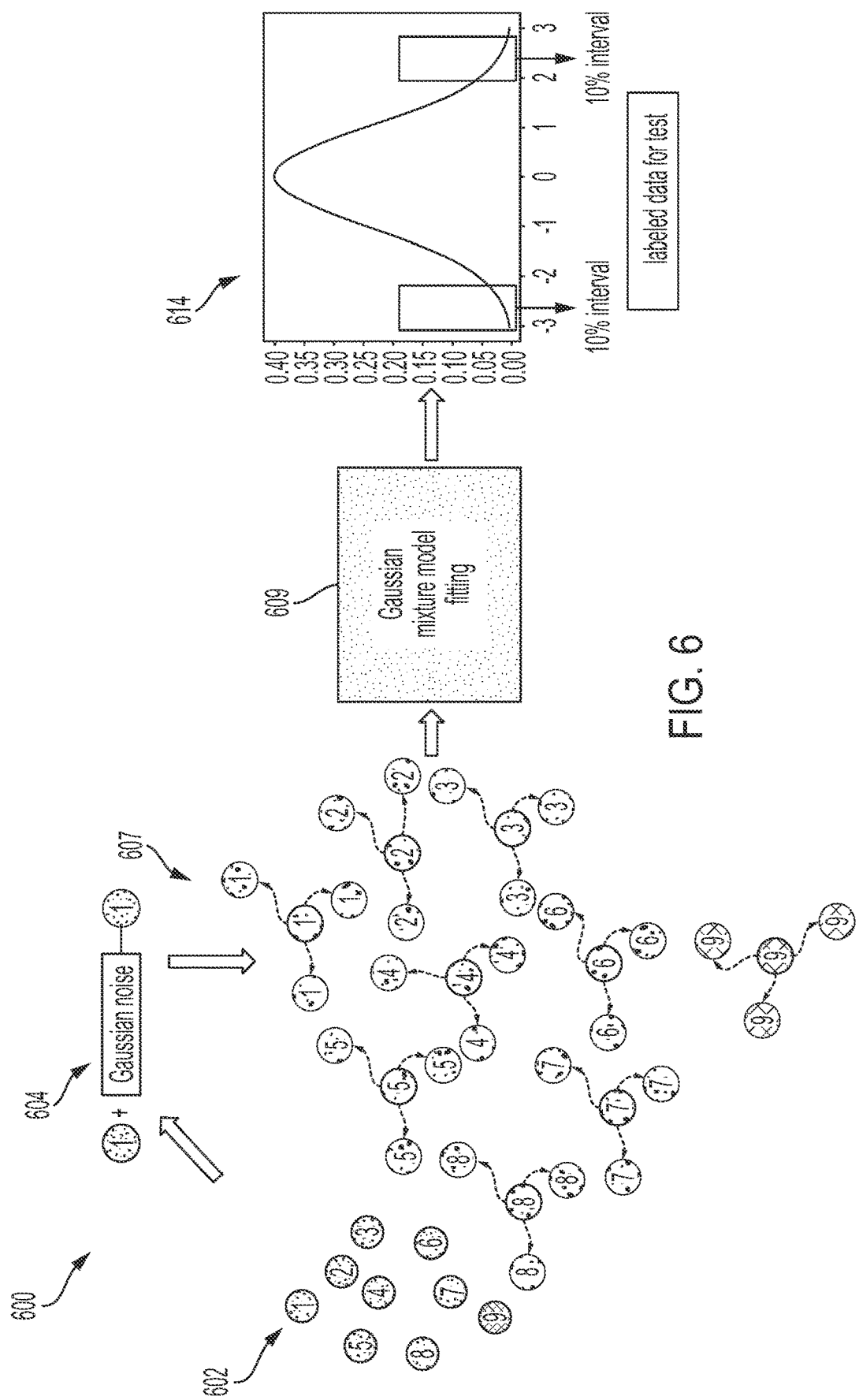
FIG. 6 illustrates a process for executing a trained model for predicting data within in a verification set and determining a probability with respect to data being mislabeled by a confidence level for returning to a labeler, in accordance with embodiments of the present invention.

FIG. 6 illustrates a process 600 for executing a trained model for predicting data within in a verification set and determining a probability with respect to data being mislabeled by a confidence level for returning to a labeler, in accordance with embodiments of the present invention. Process 600 is executed for determining how the data/code should be divided as follows:
1. For each of data points 602 within the same category, several Gaussian noises 604 are added to a vector level to generate several peripheral vectors 607 derived from data points 602. The peripheral vectors 607 in combination with an original vector enable supporting data usage based on an original data division structure.
2. A Gaussian mixture model 609 is executed to fit newly generated support data/code. The newly generated data comprises a joint probability distribution composed of two distributions of noise data distribution+correct data distribution as illustrated in graph 614. When data accounts for a small percentage of the overall data, an interval of the Gaussian distribution of the noise data within a final fit must be located within a pre-interval or a post-interval. Therefore, after fitting Gaussian mixture model 609, data/code corresponding to a first 10% of a pre-interval and a last 10% of a post-interval may be used as test training data/code.

Figure 7:
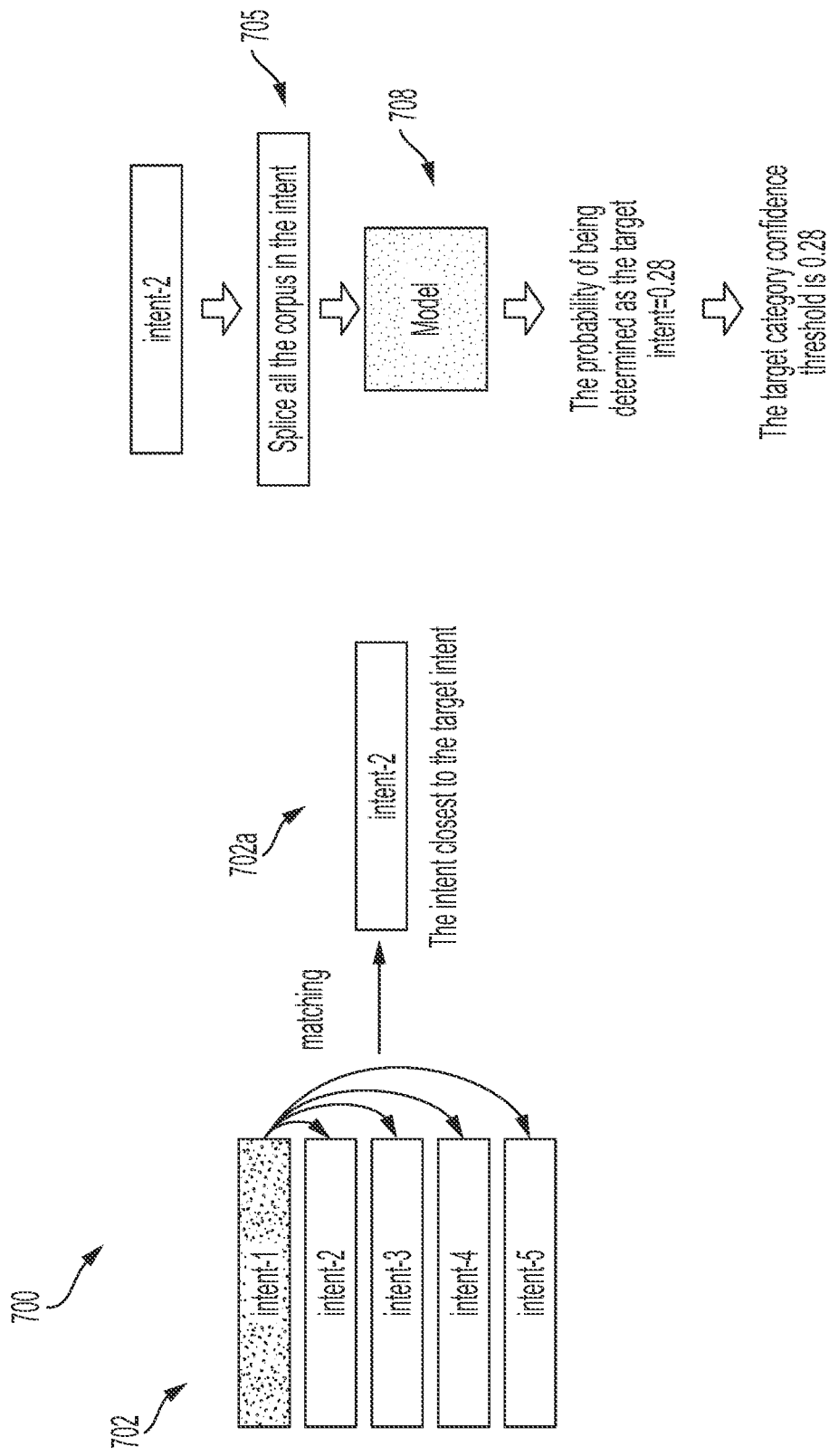
FIG. 7 illustrates a process for executing a model trained by data/code for predicting data/code within a verification set and judging a probability of mislabeled data being with respect to a confidence for return to a labeler for review, in accordance with embodiments of the present invention.

FIG. 7 illustrates a process 700 for executing a model trained by data/code for predicting data/code within a verification set and judging a probability of mislabeled data being with respect to a confidence for return to a labeler for review, in accordance with embodiments of the present invention. Process 700 is executed to determine how to customize a threshold of confidence required for each category according to different categories. For example (for different categories) a calculation is executed when a confidence level is determined to be below a return to work level. The executed calculation is processed as follows:

1. For each of target intents 702, an intent 702*a* determined to be closest to target intent is selected from remaining intents via an intent vector matching process.
2. After a training is executed, all corpus 705 within an intent closest to the target intent are spliced into a whole-intent corpus and transmitted to a training model 708 to obtain a probability that the whole-intent corpus is judged as the target intent.
3. A probability value obtained is used as a threshold of a confidence level of a target category.

Figure 8:
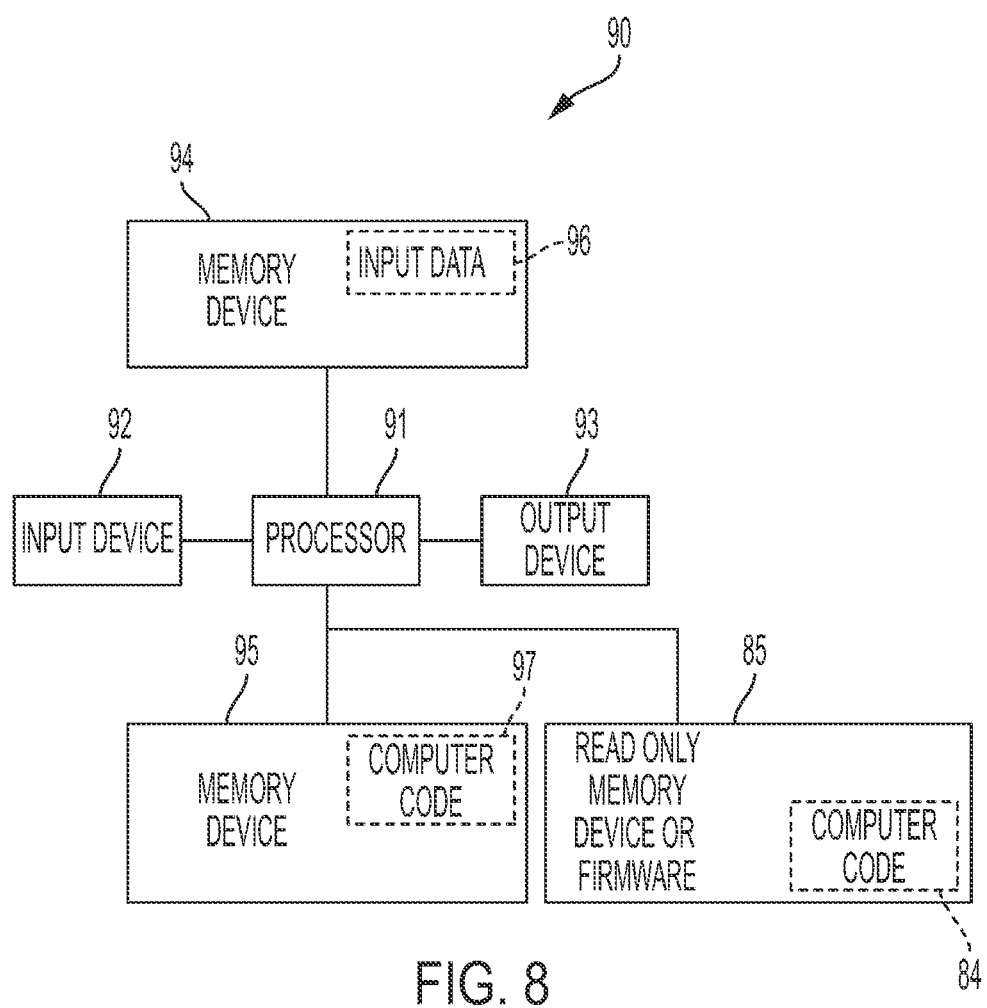
FIG. 8 illustrates a computer system used by the system of FIG. 1 for improving software technology associated with scanning hardware devices for licensed software applications and executing the licensed software applications with respect to enabling operational functionality of the hardware devices, in accordance with embodiments of the present invention.

FIG. 8 illustrates a computer system 90 (e.g., server hardware device 139, hardware device 138, control hardware/software 114, and/or hardware device(s) 116 of FIG. 1) used by or comprised by the system of FIG. 1 for improving software technology associated with categorizing groups of annotated data, detecting incorrect and correct groups of the annotated data, and enabling a filtering process for appending the groups of data to software code for software error detection, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software technology associated with categorizing groups of annotated data, detecting incorrect and correct groups of the annotated data, and enabling a filtering process for appending the groups of data to software code for software error detection. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with categorizing groups of annotated data, detecting incorrect and correct groups of the annotated data, and enabling a filtering process for appending the groups of data to software code for software error detection. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with categorizing groups of annotated data, detecting incorrect and correct groups of the annotated data, and enabling a filtering process for appending the groups of data to software code for software error detection. In another embodiment, the invention provides a business method that performs the process steps of the invention on a subscription, advertising, and/or fee basis. That is, a service supplier, such as a Solution Integrator, could offer to enable a process improving software technology associated with categorizing groups of annotated data, detecting incorrect and correct groups of the annotated data, and enabling a filtering process for appending the groups of data to software code for software error detection. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a configuration of hardware and software, any configuration of hardware and software, as would be known to a person of ordinary skill in the art, may be utilized for the purposes stated supra in conjunction with the computer system 90 of FIG. 8. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
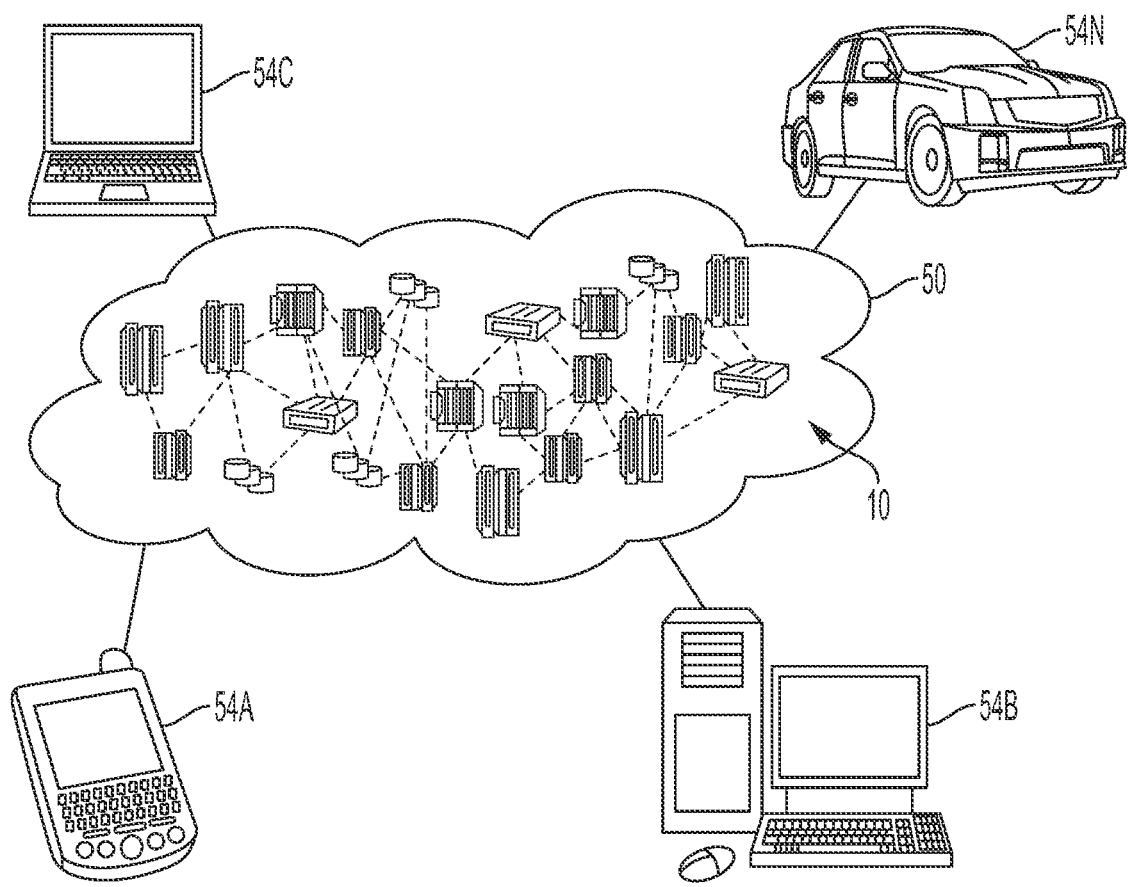
FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
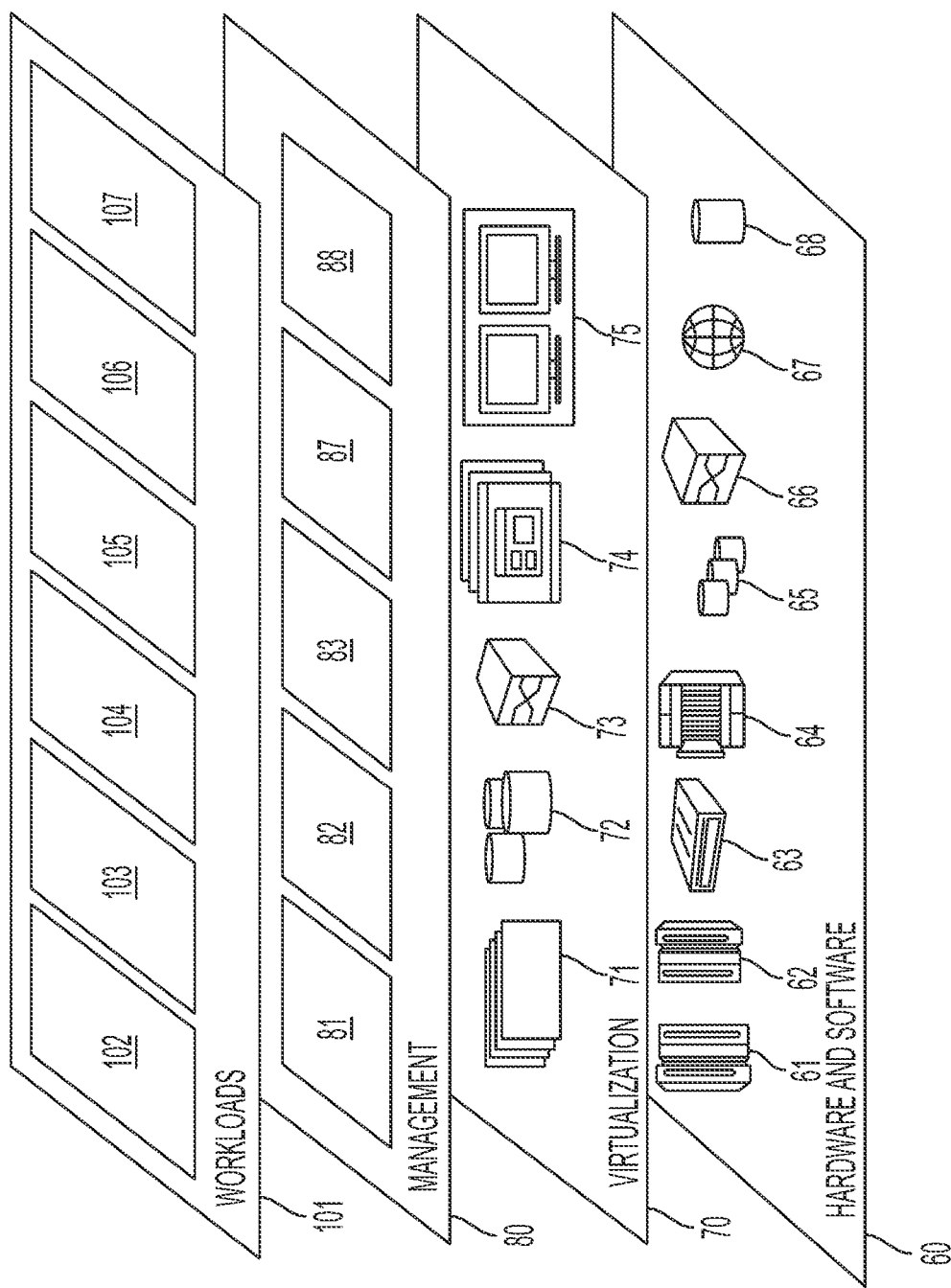
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software technology associated with categorizing groups of annotated data, detecting incorrect and correct groups of the annotated data, and enabling a filtering process for appending the groups of data to software code for software error detection 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated cognitive software application error detection method comprising:
   receiving, by a processor of a server hardware device, annotated data associated with model based self-learning software code;
   automatically dividing, by said processor, said annotated data with respect to specified categorization and grouping attributes;
   generating, by said processor in response to results of said automatically dividing, categorized groups comprising portions of said annotated data;
   analyzing, by said processor, said categorized groups;
   detecting, by said processor based on results of said analyzing, at least one incorrect annotation associated with at least one group of said categorized groups;
   filtering, by said processor, said at least one incorrect annotation from said at least one group of said categorized groups, wherein said filtering is executed based on a detected confidence level of said at least one incorrect annotation exceeding an error level threshold, and wherein generating said detected confidence level comprises:
      selecting, by said processor, a target intent with respect to associated intents with respect to a vector matching process;
      splicing, by said processor, a corpus within an intent associated with said target intent into an intent corpus;
      transmitting, by said processor, said corpus within said intent corpus to a training model for obtaining a probability value specifying that said intent corpus is associated with said target intent, wherein said training model is executed for training a training set for generating predictions with respect to a code sample within a code test set of said model based self-learning software code; and
      customizing, by said processor with respect to said predictions, said error level threshold based on a confidence level of said target intent;
   detecting, by said processor within a database, a correct annotation for said at least one group of said categorized groups;
   retrieving, by said processor from said database, said correct annotation;
   appending, by said processor, said correct annotation to said at least one group of said categorized groups;
   automatically executing, by said processor, error data rejection code with respect to code, of said model based self-learning software code, determined to be associated with an error;
   highlighting, by said processor, said code with respect to marking errors resulting in highlighted code; and
   reviewing, by said processor, said highlighted code for input into training code of said training model.

2. The method of claim 1, wherein said annotated data is associated with artificial intelligence code of said model based self-learning software code.

3. The method of claim 1, wherein said annotated data is associated with machine learning code of said model based self-learning software code.

4. The method of claim 1, wherein each categorized group of said categorized groups comprises training set portions.

5. The method of claim 1, wherein said automatically dividing said annotated data comprises:
   adding Gaussian noises to a vector level for each data point of said annotated data within a same category;
   generating peripheral vectors derived from each said data point; and
   fitting newly generated support data to Gaussian mixture model software code.

6. The method of claim 1, further comprising:
   generating, by said processor, self-learning software code for executing future processes associated with executing said automated cognitive software application error detection method; and
   storing, by said processor, said self-learning software code within a modified portion of a memory structure of said server hardware device.

7. The method of claim 6, further comprising:
   enabling, by said processor executing said self-learning software code, automated software and hardware control systems resulting in operation of hardware devices.

8. The method of claim 1, further comprising:
   providing at least one support service for at least one of creating, integrating, hosting, maintaining, and deploying computer-readable code in the server hardware device, said code being executed by the processor to implement: said receiving, said automatically dividing, said generating, said analyzing, said detecting said at least one incorrect annotation, said filtering, said detecting said correct annotation, said retrieving, and said appending.

9. A computer program product, comprising a computer readable hardware storage device storing a computer readable program code, said computer readable program code comprising an algorithm that when executed by a processor of a server hardware device implements an automated cognitive software application error detection method, said method comprising:

receiving, by said processor, annotated data associated with model based self-learning software code;

automatically dividing, by said processor, said annotated data with respect to specified categorization and grouping attributes;

generating, by said processor in response to results of said automatically dividing, categorized groups comprising portions of said annotated data;

analyzing, by said processor, said categorized groups;

detecting, by said processor based on results of said analyzing, at least one incorrect annotation associated with at least one group of said categorized groups;

filtering, by said processor, said at least one incorrect annotation from said at least one group of said categorized groups, wherein said filtering is executed based on a detected confidence level of said at least one incorrect annotation exceeding an error level threshold, and wherein generating said detected confidence level comprises:

selecting, by said processor, a target intent with respect to associated intents with respect to a vector matching process;

splicing, by said processor, a corpus within an intent associated with said target intent into an intent corpus;

transmitting, by said processor, said corpus within said intent corpus to a training model for obtaining a probability value specifying that said intent corpus is associated with said target intent, wherein said training model is executed for training a training set for generating predictions with respect to a code sample within a code test set of said model based self-learning software code; and customizing, by said processor with respect to said predictions, said error level threshold based on a confidence level of said target intent;

detecting, by said processor within a database, a correct annotation for said at least one group of said categorized groups;

retrieving, by said processor from said database, said correct annotation;

appending, by said processor, said correct annotation to said at least one group of said categorized groups;

automatically executing, by said processor, error data rejection code with respect to code, of said model based self-learning software code, determined to be associated with an error;

highlighting, by said processor, said code with respect to marking errors resulting in highlighted code; and reviewing, by said processor, said highlighted code for input into training code of said training model.

10. The computer program product of claim 9, wherein said annotated data is associated with artificial intelligence code of said model based self-learning software code.

11. The computer program product of claim 9, wherein said annotated data is associated with machine learning code of said model based self-learning software code.

12. The computer program product of claim 9, wherein each categorized group of said categorized groups comprises training set portions.

13. The computer program product of claim 9, wherein said automatically dividing said annotated data comprises:

adding Gaussian noises to a vector level for each data point of said annotated data within a same category;

generating peripheral vectors derived from each said data point; and fitting newly generated support data to Gaussian mixture model software code.

14. The computer program product of claim 9, wherein said method further comprises:

generating, by said processor, self-learning software code for executing future processes associated with executing said automated cognitive software application error detection method; and storing, by said processor, said self-learning software code within a modified portion of a memory structure of said server hardware device.

15. The computer program product of claim 14, wherein said method further comprises:

enabling, by said processor executing said self-learning software code, automated software and hardware control systems resulting in operation of hardware devices.

16. A server hardware device comprising a processor coupled to a computer-readable memory unit, said memory unit comprising instructions that when executed by the processor implements an automated cognitive software application error detection method comprising:

receiving, by said processor, annotated data associated with model based self-learning software code;

automatically dividing, by said processor, said annotated data with respect to specified categorization and grouping attributes;

generating, by said processor in response to results of said automatically dividing, categorized groups comprising portions of said annotated data;

analyzing, by said processor, said categorized groups;

detecting, by said processor based on results of said analyzing, at least one incorrect annotation associated with at least one group of said categorized groups;

filtering, by said processor, said at least one incorrect annotation from said at least one group of said categorized groups, wherein said filtering is executed based on a detected confidence level of said at least one incorrect annotation exceeding an error level threshold, and wherein generating said detected confidence level comprises:

selecting, by said processor, a target intent with respect to associated intents with respect to a vector matching process;

splicing, by said processor, a corpus within an intent associated with said target intent into an intent corpus;

transmitting, by said processor, said corpus within said intent corpus to a training model for obtaining a probability value specifying that said intent corpus is associated with said target intent, wherein said training model is executed for training a training set for generating predictions with respect to a code sample within a code test set of said model based self-learning software code; and customizing, by said processor with respect to said predictions, said error level threshold based on a confidence level of said target intent;

detecting, by said processor within a database, a correct annotation for said at least one group of said categorized groups;

retrieving, by said processor from said database, said correct annotation;
appending, by said processor, said correct annotation to said at least one group of said categorized groups;
automatically executing, by said processor, error data rejection code with respect to code, of said model based self-learning software code, determined to be associated with an error;
highlighting, by said processor, said code with respect to marking errors resulting in highlighted code; and
reviewing, by said processor, said highlighted code for input into training code of said training model.

\* \* \* \* \*